UNITED STATES PATENT OFFICE.

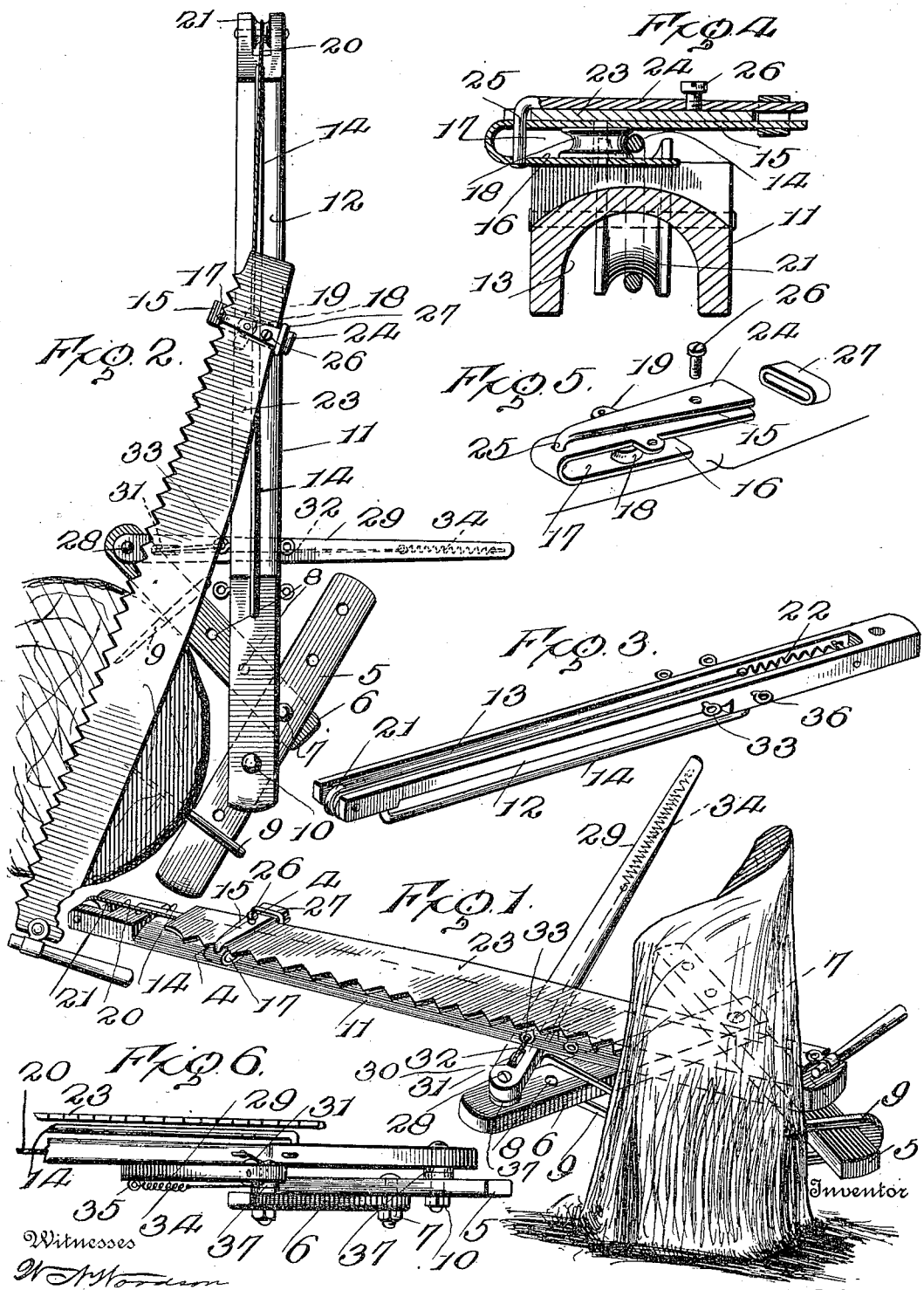

SAMUEL JULIN BLACK, OF MEADOWDALE, WASHINGTON.

TREE-FELLING DEVICE.

962,116.      Specification of Letters Patent.    Patented June 21, 1910.

Application filed October 11, 1909. Serial No. 522,119.

*To all whom it may concern:*

Be it known that I, SAMUEL JULIN BLACK, of Meadowdale, Snohomish county, State of Washington, have invented a new and useful Device Known as a One-Man Tree-Faller, of which the following is a specification, to wit:

This invention relates to tree felling apparatus and has for its object the provision of a strong, durable and thoroughly efficient device of this character, the construction of which is such that one man may readily fell a tree without the assistance of a helper.

A further object is to provide a tree feller, the attaching arms of which may be adjusted to accommodate trees of different cross sectional diameters and may be used as either a right or left hand felling device.

A further object is to provide a tree feller, capable of being readily attached to a tree and quickly detached therefrom and the parts thereof compactly folded for shipment or storage.

A further object is to provide means for feeding the saw through the tree, and means for automatically returning the saw to normal position after each working stroke.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the means for effecting the result, reference is to be had to the following description and accompanying drawings, in which:

Figure 1 is a perspective view of a tree felling apparatus constructed in accordance with my invention, showing the same in position on a tree; Fig. 2 is a top plan view of the same showing the position of the saw when the tree is partly severed; Fig. 3 is a bottom plan view of the saw supporting arm detached; Fig. 4 is a transverse sectional view taken on the line 4—4 of Fig. 1; Fig. 5 is a detail perspective view of the saw carrier, the clamping screw and collar being separated therefrom; Fig. 6 is a detail side elevation of a portion of the apparatus.

Corresponding and like parts are referred to in the following description and indicated in all the views of the drawings by the same reference characters.

The improved tree felling device forming the subject matter of the present invention comprises an attaching member preferably formed of co-acting arms 5 and 6 pivotally connected at 7 and provided with a plurality of spaced openings 8, said attaching member being secured to the base of a tree by means of staples or similar fastening devices 9 embracing the arms 5 and 6 with their pointed ends driven or otherwise embedded into the tree, as shown.

Pivotally connected at 10 with the long arm 5 of the attaching member is a saw support, preferably in the form of a lever 11 having its upper surface cut-away at 12 and its lower face provided with a longitudinally disposed groove 13 extending approximately the entire length of said lever.

Secured to the upper surface of the saw support or lever 11 at the cut-away portion thereof, is a guide rod 14 on which is slidably mounted a saw carrier 15. The saw carrier 15 comprises a plate having one end thereof bent upon itself to form an overhanging hook 16 defining an intermediate chamber 17.

Mounted for rotation in the chamber 17, is a grooved wheel or roller 18 adapted to bear against the guide rod or track 14 as the saw carrier is reciprocated.

Secured to or formed integral with the carrier 15, are oppositely disposed perforated ears 19 to one of which is connected the adjacent end of a cord or cable 20, the opposite end of which passes over a grooved pulley 21 journaled in the bifurcated end of the saw support 11 and is thence extended longitudinally within the seating groove 13 for attachment to a coil spring 22, the function of which is to return the saw 23 to normal position after each working stroke.

The saw 23 is retained in position on the carrier 15 by means of a clamping plate 24, one end of which is provided with an angular extension 25 which projects through suitable openings in the carrier so as to form in effect a pivotal connection between the plate 24 and said carrier. The lower surface of the clamping member or plate 24 is spaced from the upper surface of the carrier to permit the insertion of the adjacent end of the saw 23, the latter being clamped in position on the carrier by means of a screw 26 extending through a threaded opening in the plate 24 and bearing against the adjacent surface of the saw, as shown. A clamping band 27 is preferably extended over the ends of the plates 15 and 24 to assist in retaining the parts in assembled position and also to assist in preventing accidental displacement of the saw.

Pivotally connected at 28 with the short arm 5 of the attaching member is a brace 29, which latter extends beneath the lever or saw support 11 and assists in sustaining the weight of the same. A slot 30 is formed in the pivoted end of the brace 29 for the reception of a grooved wheel 31, the latter being adapted to engage a cord or cable 32, one end of which is attached to an eye 33 on the saw support, while the other end of the cable extends beneath the brace for attachment to a coil spring 34 fastened to an eye 35 depending from said brace. The tension of the spring 34 is such as to force the support 11 in the direction of the tree, thus to normally and yieldably press the teeth of the saw against said tree and assist in feeding the saw transversely through the tree during the sawing operation. The flexible connection between the brace and saw support also permits said support to be adjusted laterally to accommodate trees of different cross sectional diameters.

In using the device, the arms 5 and 6 are positioned against one side of a tree near the base thereof and secured to said tree by means of the staples or fastening devices 9. One end of the saw 23 is then positioned on the carrier 15 and clamped in engagement therewith by adjusting the screw 26 and sleeve or collar 27. With the parts in this position the felling of a tree is effected by reciprocating the saw 23, the spring 24 serving to automatically return the saw to normal position after each working stroke, and the spring 34 serving to feed the saw through the tree, as before stated. By placing the pivot pin 7 in the different openings 8 in the attaching arms, said arms may be lengthened or shortened so as to engage trees of different sizes. The position of the brace 29 may also be varied at will by removing the pivot pin or bolt 28 and positioning said bolt in any one of the openings on the relatively short arm 6. When the position of the brace 29 is changed with respect to the short arm 6 of the attaching device, the cable is detached from the eye 33 and secured to a similar eye 36, there being a pair of said eyes extending laterally from opposite sides of the saw support, as shown. Suitable washers 37 preferably surround the pivot pins 7, 10 and 28 in order to properly space the parts and prevent the same from coming in contact with the staples 9 during the sawing operation.

It will here be noted that after a kerf or cut is formed in a tree, the saw may be tilted with the pulley or roller 18 as a pivot so as to permit the passage of the saw through the tree, as best shown in Fig. 2 of the drawings. It will also be observed that by reversing the position of the arms 5 and 6 of the attaching member and placing said attaching member on the opposite side of the tree, the feller may be used either as a right or left hand device.

Having thus described the invention, what is claimed as new is:

1. A tree felling device including an attaching member, a saw support pivotally connected with the attaching member, a brace extending beneath the saw support, a saw mounted for reciprocation on the support, and a connection between the brace and saw support for yieldingly supporting the teeth of the saw against the side of a tree.

2. A tree felling device including an attaching member, a saw support pivotally connected with the attaching member, a saw mounted for reciprocation on the support, a brace carried by the attaching member and extending beneath the saw support, and means forming a connection between the brace and saw support for feeding the saw transversely through a tree.

3. A tree felling device including pivotally connected attaching arms, a saw support pivotally connected with one of the arms, a brace pivotally connected with the other arm and extending beneath the saw support, a saw mounted for reciprocation on the support, and a flexible connection between the brace and saw support for yieldably supporting the teeth of the saw in contact with a tree.

4. A tree felling device including pivotally connected attaching arms, a saw support pivotally connected with one of the arms, a brace extending beneath the saw support, a saw carrier mounted for reciprocation on the saw support, and means forming a connection between the saw support and carrier for automatically returning the saw to normal position after each working stroke.

5. A tree felling device including an attaching member, a saw support pivotally connected with the attaching member, a brace extending laterally from the attaching member and disposed beneath the saw support, a saw carrier mounted for reciprocation on the saw support, a flexible connection between the brace and saw support for yieldably supporting the teeth of the saw against the side of a tree, and a spring operatively connected with the saw support and carrier for returning the saw to normal position after each working stroke.

6. A tree felling device including an attaching member, a saw support pivotally connected with the attaching member, a brace extending beneath the saw support, a guide rod carried by the saw support, a saw carrier mounted for reciprocation on the rod, a spring operatively connected with the saw support and carrier for returning the saw to normal position after each working stroke, and a flexible connection between the brace and saw support for yieldably supporting the teeth of the saw against the side of a tree.

7. A tree felling device including pivotally connected attaching arms, a saw support pivotally connected with one of the arms and having its lower face provided with a longitudinal groove, and its free end provided with a roller, a guide rod secured to the upper face of the saw support, a saw carrier slidably mounted on the guide rod, a spring carried by the saw support, a cable connected with the saw carrier and extending over the grooved wheel and within the groove of the saw support for attachment to the spring, a brace extending beneath the saw support, and a flexible connection between the brace and said saw support.

8. A tree felling device including pivotally connected attaching arms, a saw support pivotally connected with one of the arms, a saw carrier mounted for reciprocation on the saw support, means operatively connected with the saw carrier for returning the saw to normal position after each working stroke, a brace pivotally connected with one of the attaching arms and extending beneath the saw support, said brace being provided with a recess having a grooved wheel journaled therein, a spring carried by the brace, and a cable having one end thereof secured to the saw support and its other end extending over the grooved wheel for connection with the spring.

9. A tree felling device including pivotally connected attaching arms, a saw support pivotally connected with one of the arms and having spaced eyes extending laterally therefrom, a guide rod secured to the upper surface of the saw support, a saw carrier mounted for reciprocation on the guide rod, a spring carried by the saw support, a cable having one end thereof connected with the saw carrier and its other end extended over the free end of the saw support for attachment to the spring, a brace pivotally connected with the other attaching arms and extending beneath the saw support, a grooved wheel journaled in the brace, a spring secured to the free end of the brace, and a cable having one end thereof secured to the spring and its other end extended over the grooved wheel for attachment to one of the eyes on the saw support.

10. A tree felling device including an attaching member, a saw support pivotally connected with the attaching member, a brace carried by the attaching member and extending beneath the saw support, a saw carrier mounted for reciprocation on the saw support and comprising a plate bent upon itself to form a hook defining an intermediate chamber, a grooved wheel journaled in said chamber and adapted to bear against the guide rod, a clamping plate forming a part of the saw carrier, laterally extending lugs formed on the saw carrier, a spring carried by the saw support, and a cable having one end thereof secured to the spring and its other end passed over the free end of the saw support for attachment to the adjacent lug.

In witness whereof I have hereunto set my hand this 27th day of September, 1909.

SAMUEL JULIN BLACK.

Witnesses:
   SAMUEL JOSEPH WHITE,
   CHRISTOPHER THEOPHILUS ROSEOE, Jr.